(12) United States Patent  (10) Patent No.: US 8,745,585 B2
Watters et al.  (45) Date of Patent: Jun. 3, 2014

(54) META-DATA FOR SINGLE DEVELOPMENT TEST ENVIRONMENT

(75) Inventors: Christina Watters, Oxford, PA (US); Peter Johnson, Foothill Ranch, CA (US); Robert S. Baker, Telford, PA (US)

(73) Assignee: Unisys Corporation, Blue Bell, PA (US)

(*) Notice: Subject to any disclaimer, the term of this patent is extended or adjusted under 35 U.S.C. 154(b) by 203 days.

(21) Appl. No.: 13/339,892

(22) Filed: Dec. 29, 2011

(65) Prior Publication Data

US 2013/0174122 A1  Jul. 4, 2013

(51) Int. Cl.
*G06F 7/00* (2006.01)
*G06F 17/00* (2006.01)
*G06F 15/173* (2006.01)
*H04L 29/06* (2006.01)
*H04L 9/32* (2006.01)
*G06F 9/44* (2006.01)
*G06F 9/46* (2006.01)

(52) U.S. Cl.
USPC ........... 717/121; 707/636; 707/798; 709/223; 713/156; 713/176; 717/100; 717/101; 717/123; 717/135; 718/104

(58) Field of Classification Search
None
See application file for complete search history.

(56) References Cited

U.S. PATENT DOCUMENTS

| 7,904,480 | B2 * | 3/2011 | Palanisamy | 707/798 |
| 8,001,083 | B1 * | 8/2011 | Offer | 707/636 |
| 8,037,453 | B1 * | 10/2011 | Zawadzki | 717/123 |
| 2003/0182470 | A1 * | 9/2003 | Carlson et al. | 709/328 |
| 2004/0139315 | A1 * | 7/2004 | Tokutani et al. | 713/156 |
| 2007/0006176 | A1 * | 1/2007 | Spil et al. | 717/135 |
| 2007/0083762 | A1 * | 4/2007 | Martinez | 713/176 |
| 2007/0299858 | A1 * | 12/2007 | Norcott | 707/102 |
| 2008/0065750 | A1 * | 3/2008 | O'Connell et al. | 709/223 |
| 2008/0133558 | A1 * | 6/2008 | Carlson et al. | 707/100 |
| 2009/0182789 | A1 * | 7/2009 | Sandorfi et al. | 707/204 |
| 2009/0300641 | A1 * | 12/2009 | Friedman et al. | 718/104 |
| 2010/0306730 | A9 * | 12/2010 | Carlson et al. | 717/101 |
| 2012/0124547 | A1 * | 5/2012 | Halbedel | 717/100 |

* cited by examiner

*Primary Examiner* — Don Wong
*Assistant Examiner* — Anibal Rivera
(74) *Attorney, Agent, or Firm* — James E. Goepel

(57) ABSTRACT

System and method for generating meta-data for a product is disclosed. An artifact repository stores first artifacts for building the product. The artifact repository stores first meta-data for one or more of the artifacts in the repository. A build manager builds second artifacts for the product from source code and one or more of the first artifacts based on information in a project script. The build manager is adapted to combine the first meta-data for each of the one or more of the first artifacts used to build the second artifact to form second meta-data for each of the second artifacts.

17 Claims, 12 Drawing Sheets

| Source code management repository version number | Product version number | Artifact version number |
| --- | --- | --- |
| 1.0 | 1.0 | 1.0.1.0 |
| 2.0 | 1.0 | 1.0.2.0 |
| 3.0 | 1.0 | 1.0.3.0 |
| 4.0 | 1.0 | 1.0.4.0 |
| 5.0 | 1.1 | 1.1.5.0 |
| 5.1 | 1.1 | 1.1.5.1 |
| 5.2 | 1.2 | 1.2.5.2 |
| 6.0 | 2.0 | 2.0.6.0 |

FIG. 3A

| Source code management repository version number | Third party repository version number | Product version number | Artifact version number |
|---|---|---|---|
| 1.0 | 7.1 | 1.0 | 1.0.1.0.7.1 |
| 2.0 | 7.1 | 1.0 | 1.0.2.0.7.1 |
| 2.1 | 7.2 | 1.0 | 1.0.2.1.7.2 |
| 2.2 | 7.3 | 1.0 | 1.0.2.2.7.3 |
| 3.0 | 8.0 | 1.1 | 1.1.3.0.8.0 |
| 3.1 | 9.0 | 1.1 | 1.1.3.1.9.0 |
| 3.2 | 9.1 | 1.2 | 1.2.3.2.9.1 |
| 3.3 | 9.2 | 2.0 | 2.0.3.3.9.2 |

FIG. 3B

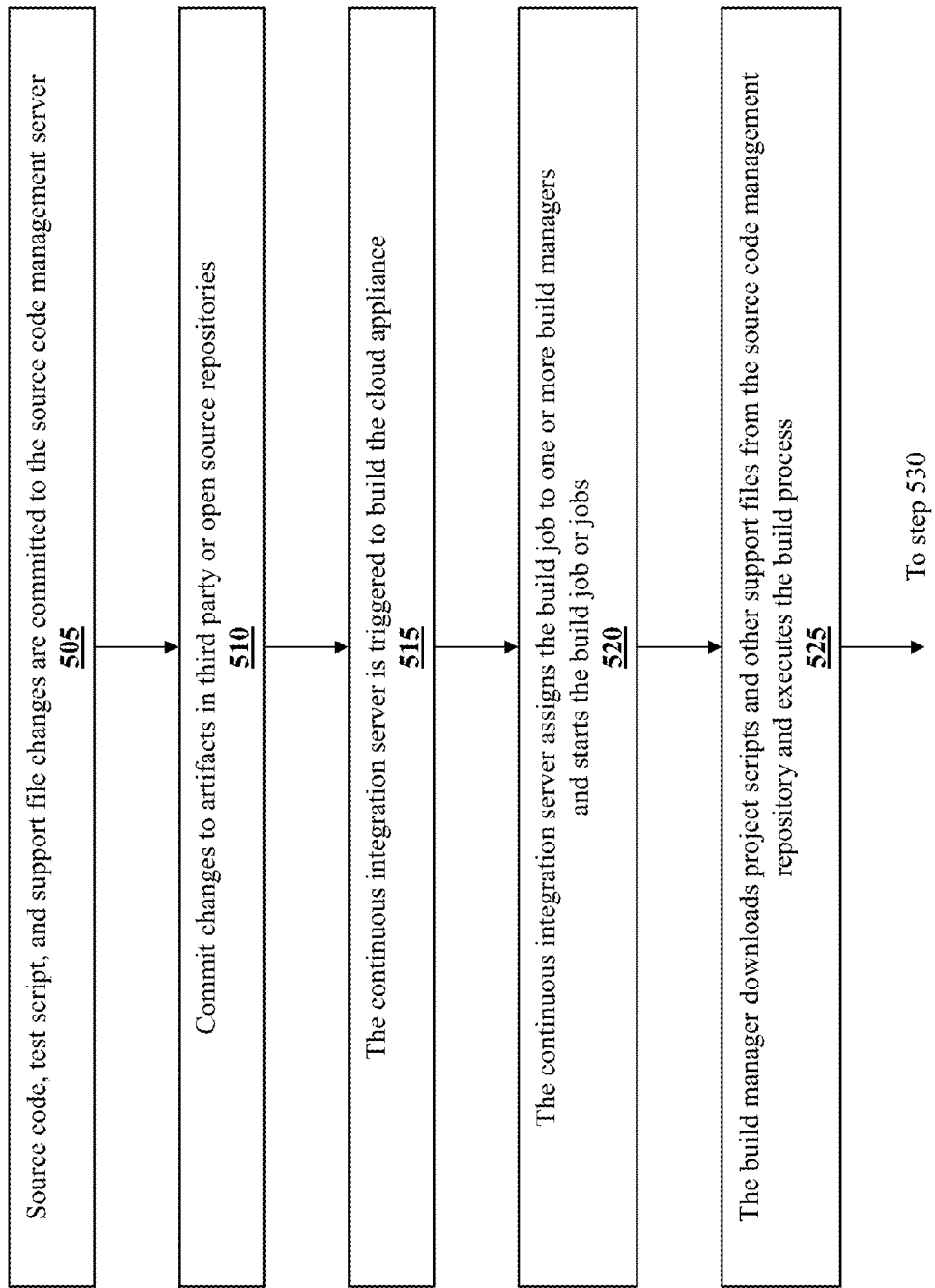

META-DATA FOR SINGLE DEVELOPMENT TEST ENVIRONMENT

CROSS-REFERENCE TO RELATED APPLICATIONS

This application relates to U.S. Patent Application, entitled "VERSION NUMBERING IN SINGLE DEVELOPMENT AND TEST ENVIRONMENT," filed herewith and U.S. Patent Application entitled "SINGLE DEVELOPMENT TEST ENVIRONMENT," filed herewith, which are hereby incorporated by reference in their entirety.

TECHNICAL FIELD

The present invention relates generally to a system for continuous system development and continuous integration methodologies.

BACKGROUND

Software development is complex and expensive. Many techniques have been developed to attempt to reduce the complexity, produce more reliable software, and reduce the expense.

Many software development projects use a waterfall development process. A waterfall process is a sequential software development process, that has, for example, phases of conception, initiation, analysis, design, construction, testing, production and maintenance. The waterfall development process has been very successful, especially for large projects in which the final product is well-defined and unlikely to change significantly once finished. The waterfall process, however, is not suitable for software that is continuously being improved, because each improvement has to go through all of the stages above before finally being incorporated into the product. The waterfall process leads to a sequential approach in which each new feature to be added to the product must be added in sequence and tested before the next feature can be started.

In recent years, software projects have become larger, relying on large stable, prewritten components being connected together to form the software. Each of the prewritten components may gradually evolve as bugs are fixed and new functionality is added. However, the basic functionality of each prewritten component remains the same. Thus, software development is about connecting together these prewritten components and checking that the changes to the prewritten components do not adversely affect the software as a whole. Any software project may comprise a large number of these prewritten components, all of which may be constantly evolving. The waterfall process is a slow and expensive method to test and deploy software written in the above manner, causing unnecessary delays in the time it takes a customer to receive updated software that is more reliable and has more features.

SUMMARY

The systems and methods described herein attempt to overcome the drawbacks discussed above.

In one embodiment, a system for generating meta-data for a product is disclosed. An artifact repository stores first artifacts for building the product. The artifact repository stores first meta-data for one or more of the first artifacts. A build manager builds second artifacts for the product from source code and one or more of the first artifacts based on information in a project script. The build manager is adapted to combine the first meta-data for each of the one or more of the first artifacts used to build the second artifact to form second meta-data for each of the second artifacts.

In another embodiment, a method for generating meta-data for a product is disclosed. An artifact repository stores first artifacts for building the product and first meta-data for one or more of the stored first artifacts. A build manager builds second artifacts for the product from source code and one or more of the first artifacts based on information in project meta-data. The build manager combines the first meta-data for each of the one or more of the first artifacts used to build the second artifact to form second meta-data for each of the second artifacts.

In yet another embodiment, a machine-readable tangible and non-transitory medium with information recorded thereon, wherein the information, when read by a machine, causes the machine to store, by an artifact repository, first artifacts for building a product and storing, by the artifact repository, first meta-data for one or more of the stored first artifacts. The information causes the machine to build, by a build manager, second artifacts for the product from source code and one or more of the first artifacts based on information in project meta-data. The information causes the machine to combine, by the build manager, the first meta-data for each of the one or more of the first artifacts used to build the second artifact to form second meta-data for each of the second artifacts.

BRIEF DESCRIPTION OF THE DRAWINGS

The accompanying drawings constitute a part of this specification, and illustrate embodiments of the invention and together with the specification, explain the invention.

FIGS. 3A and B illustrate examples of revision numbers in a source code management repository, build numbers, and the artifact numbers, according to embodiments of the disclosure.

FIG. 5A-D illustrates a method of building a cloud appliance according to an embodiment.

DETAILED DESCRIPTION

Figure 1:
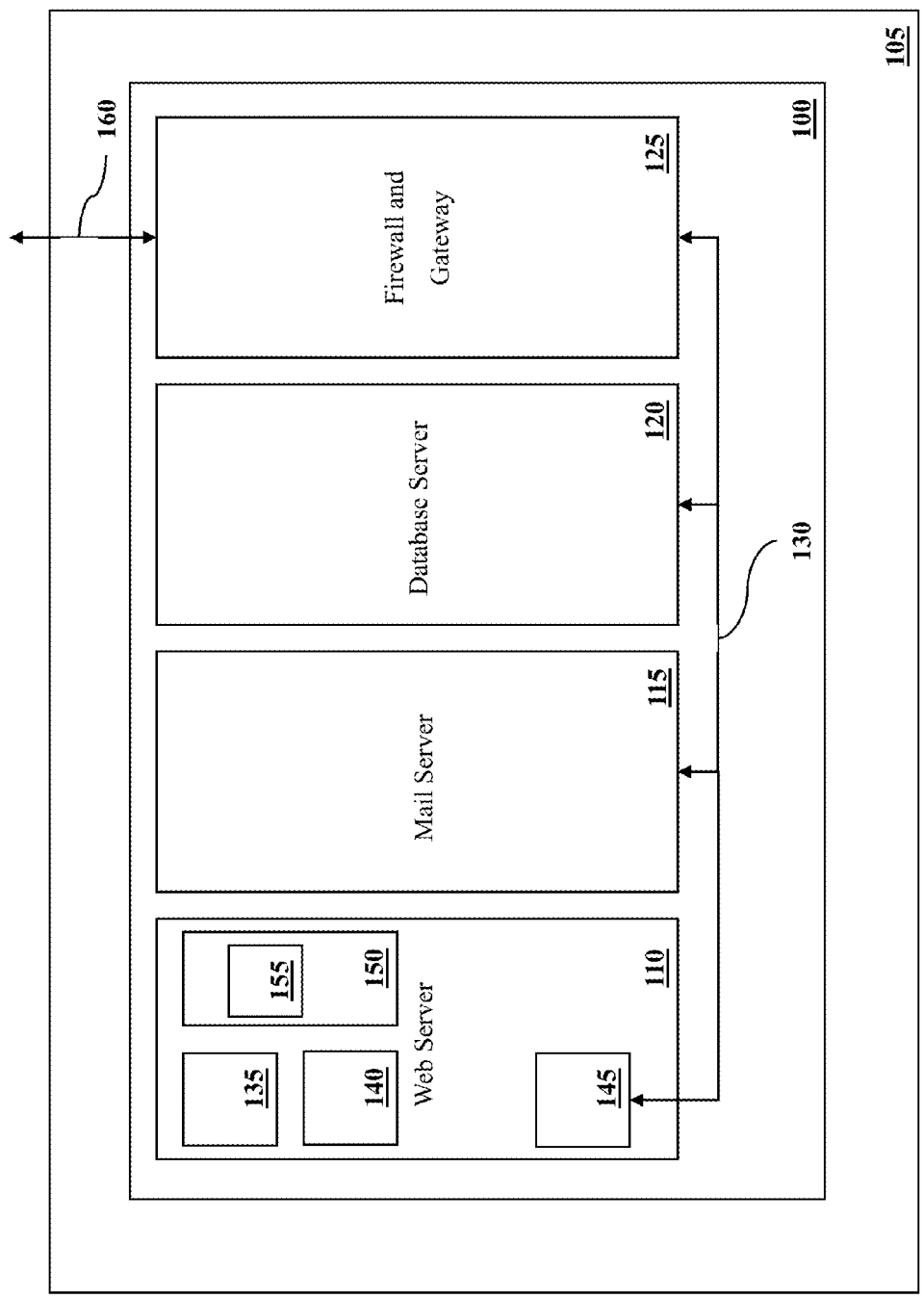
FIG. 1 illustrates a cloud appliance according to an embodiment.

As noted above, many software development projects use a waterfall development process. Continuous integration is an alternative method for software development that is quite different from the waterfall approach to software development. In continuous integration, the implementation and the release of new features are carried out in small increments. An advantage of continuous integration is in preserving existing product functionality while continuously implementing new features. Continuous integration enables much smoother and more frequent customer releases, and works well for software products in a fast moving environment in which new features are constantly added.

In continuous integration, developers are encouraged to frequently incorporate changes into the mainstream source code. This must be done by a highly automated procedure that is rigorously followed so that any regression can quickly be identified and fixed as regression occurs.

In continuous integration, new code is committed by developers frequently so that other developers are aware of, and able to determine the affect of, the changes in the committed new code. Thus, errors do not arise without developers noticing the errors and correcting the errors immediately. A new build may be triggered by every commit to a repository, rather than a periodically scheduled build. In multi-developer environments with a short interval between commits by different developers, it is better to delay building for a short time after each commit to reduce the burden on the build environment. Continuous integration tools such as CruiseControl™, Jenkins™, Hudson™, Bamboo™, BuildMaster™, or Teamcity™ offer this scheduling automatically.

A high level of automation is required because at any moment in time there may be hundreds of source files for the code with complex dependencies. A build of the source code uses the latest version in the source files, and it is difficult to figure out by hand which parts of the source code are already compiled or should be recompiled. Developers require that the latest version of every source file is included in the compiled code when doing testing and debugging. Moreover, once a successful build is complete, it is important to be able to track accurately versions of the source files that produced the successful build. If testing of the above working build is also successful, then the source code of the successful build can be incorporated into a larger system. However, the source code for the successful build must be identified, and the development team may already have written new versions of portions of the source code to implement the next feature while the above testing was in process.

Thus, a key component of an automated environment is a source code management repository through which all changes to source code, packaging, databases, configurations, etc. are made. A typical source code management repository enables developers to track version history, releases, and parallel versions (i.e., branches) of all products. It also enables developers to retrieve previous versions of a product component or release for building, testing, debugging, etc.

For cloud system development there are, however, many types of files in the source code management repository, third party repositories, and open source repositories that are not found in standard software development environments. Cloud development not only includes the development of programs that run on a single computer or group of computers, but also includes directories, files and formats that specify virtual machines on which the programs will run, directories, files and formats that specify the configurations of the virtual machines, and directories, files and formats that specify the interconnection of the virtual machines. Moreover, these directories, files, and formats may be in the form of source files, compiled files, or archive files. Such directories, files, and formats include, for example open virtualization format (OVF) files that package virtual appliances, and the archive format of the OVF directory, the OVA package. The OVF format provides a complete specification of the virtual machine. This includes the full list of required virtual disks and the required virtual hardware configuration, including CPU, memory, networking, and storage. An administrator can quickly provision this virtual machine into virtual infrastructure with little or no manual intervention. In addition, the OVF is a standards-based, portable format that allows the user to deploy this virtual machine in any hypervisor that supports OVF.

For continuous integration to work all of these files that are not source code are under the control of a revision control system. These non-source-code files are known as artifacts and all artifacts required to build the project are placed in an artifact repository. Thus, the system should be buildable from a commit and not require additional dependencies available in an inaccessible repository.

FIG. 1 illustrates a cloud appliance 100. The cloud appliance 100 is hosted on a computer 105. The appliance 100 comprises virtual machines 110, 115, 120, 125. The virtual machines are connected by virtual network 130. The virtual machines comprise a virtual CPU, memory, networking, and storage. For example, virtual machine 110 comprises virtual CPU 135, memory 140, network adapter 145, and storage 150. The storage 150 may comprise one or more virtual disks 155. The virtual disks 155 include operating systems, drivers, and application software that run on the virtual machine 110. These virtual machines 110, 115, 120, 125 may be configured to perform particular tasks. For example, virtual machine 110 may be configured as a Web server, virtual machine 115 may be configured as a mail server, virtual machine 120 may be configured as a database server, and virtual machine 125 may be configured as a firewall and gateway. The virtual machines may be connected to a real network. For example, virtual machine 125 is connected to a network 160. Thus, the cloud appliance 100 is configured to serve web pages, provide e-mail service, and database services to users, via the network connection 160. The appliance 100 may be provided as a single software package. The software package may be, for example, in the form of one or more .OVA files as discussed above. The .OVA file may contain one or more OVF packages, each package defining one of the virtual machines 110, 115, 120, 125.

The software package for the appliance 100 may be a very complex package to build and test. A large number of source files are maintained, and built in the correct order to produce the software package for the appliance 100. To construct the software package for the appliance 100, application files are written and tested for each of the virtual machines. The application files are tested on real machines or virtual machines before the applications are installed on the virtual machines of the cloud appliance 100. Templates for each of the virtual machines are purchased or written. The templates for the virtual machines are instantiated into virtual machines on one or more servers, and if the instantiated virtual machine is not preloaded with an operating system, an operating system is loaded onto the virtual machines. The virtual machines are then configured, for example, to communicate with other virtual machines via a network. One or more applications, drivers, databases, etc. may then be installed or loaded onto the virtual machines. The virtual machines are tested to ensure that the operating systems and applications that have been installed perform correctly. When the testing is complete, the virtual machines may be further tested as a part of the cloud appliance 100. If the cloud appliance 100 passes all of the tests, the software package for the appliance 100 can be built and deployed, for example, as one or more .OVA files.

A change in any one of the templates, the applications, or the operating systems, causes the build and the test of the software package of the cloud appliance 100 to be repeated. If, for example, a bug is found in an application, the bug is fixed and the source files for the application updated. The application is then tested to check that the bug is corrected and that no new bug has been introduced. The virtual machine that runs the application is then rebuilt with the revised application. The virtual machine that runs the application is then retested, because although the application may run perfectly on a test machine, the revised application may not run perfectly on the virtual machine. The rebuilt and tested virtual machine is then configured to connect to the other virtual machines in the cloud appliance 100, and cloud appliance 100 is tested. The virtual machines that do not run the revised application do not need to be rebuilt and tested individually, however, the cloud appliance 100 should be tested with the revised application. Building the entire cloud appliance from the source files and templates is time-consuming. Testing applications and virtual machines is also time-consuming. Therefore, systems that can track which source files are to be recompiled, and which tests are to be done based on changes to the source files are advantageous. For continuous integration to work effectively, the build and test is as automated as possible. If the build and test is not automated, it can rapidly become difficult to determine which source files are the current source files, which versions of the cloud appliance 100 are working versions, and which features that these working versions enable.

Automating the build of the cloud appliance 100 is not straightforward because unlike a software build for, for example, an application that runs on a single machine, the source files for building the cloud appliance 100 are far more diverse. The source files include, source files written in computer languages such as C, C#, C++, Java, BASIC, etc. The source files also include precompiled applications, drivers, libraries, etc., for example, .DLL files, .EXE files, .JAR files, .TAR files etc. as well as the OVF and OVA files discussed above. The reason for the diversity in files is that the virtual machines can be a loaded with software run on a standalone machine. Thus, for example, a build of the cloud appliance may include running the install files for an application like a word processor, a mail program, or a web server application on the virtual machine. Such processes would normally be carried out by a system administrator or machine owner. In the cloud appliance build, these installations are automated by using, for example Windows PowerShell™ scripts.

A separate issue with building cloud appliances, for example, the appliance 100, is keeping track of licensing and payment for all of the components used to build the cloud appliance. For example, one version of the cloud appliance 100 may use an application that has a general public license. A subsequent version may replace the above application with a commercial piece of software that requires a license and license fees. In continuous integration, the licensing may change from built to build depending on the combination of applications, operating systems, and virtual machines in use. Due to the large number of these components, automatic tracking of licensing for any particular version of the cloud appliance becomes advantageous.

Figure 2:
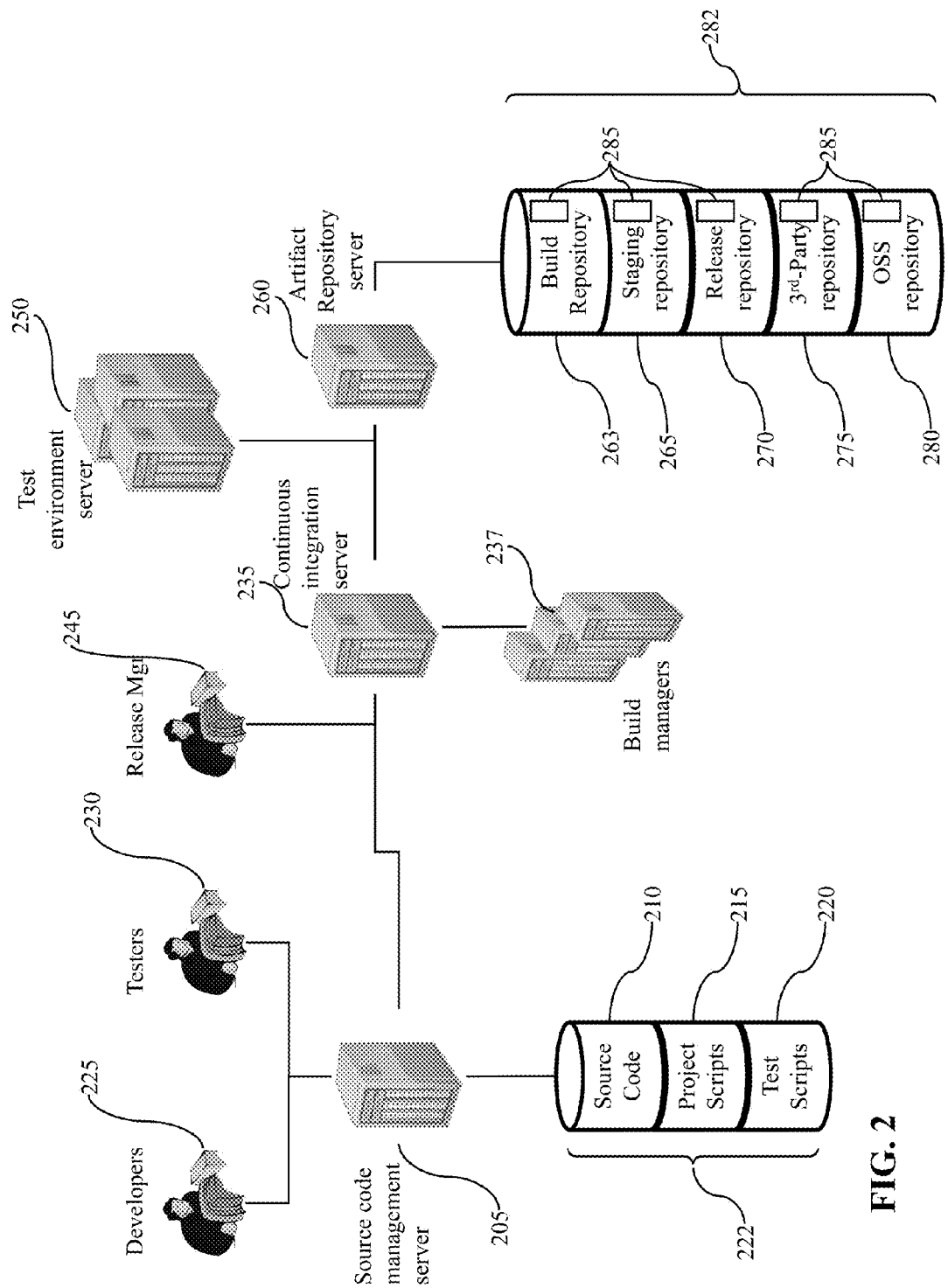
FIG. 2 illustrates a system for continuous integration for building cloud appliances, according to an embodiment.

FIG. 2 illustrates a system 200 for continuous integration for building cloud appliances, according to an embodiment. The system 200 comprises a number of servers, including source code management server 205, a continuous integration server 235, a test environment server 250, and an artifact repository server 260 that stores artifacts 285.

The source code management server 205 manages source code being developed for cloud appliances, for example, cloud appliance 100. Developers 225 write source code 210 and project scripts 215 for producing the cloud appliances. In some embodiments, the project scripts have associated metadata for specifying information such as artifacts 285 to be used for the project. The source code includes code for applications to run on the virtual machines of the cloud appliance, drivers to run on the cloud appliance, etc. The project scripts 215 include scripts for assembling the virtual machines, for example, installing software on a virtual machine, configuring a virtual machine to connect to another virtual machine, configuring the order in which virtual machines are instantiated and connected. The source code management server 205 also manages test scripts 220. The test scripts 220 are written by testers 230. The test scripts 220 of the testing applications, drivers, virtual machines, and cloud appliances. The test scripts 220 are used by the test environment server 250 to run tests on portions of a cloud appliance. The source code management server 205 may be, for example, a server running Apache™ and Subversion®. The source code management server 205 is a version control system that keeps track of changes made to files and directories, providing data recovery and history of the changes that have been made to source code and documentation over time. Thus, each time a new version of a portion of the source code, project scripts 215 or test code is changed, the source code management server 205 keeps a record of the changes and updates the version numbers, according to a predetermined system for determining version numbers. The source code 210, project scripts 215, and test scripts 220 are stored in a source code management repository 222.

Although the terms "version number" and "revision number" are used throughout the disclosure, it should be understood that version numbers and revision numbers may include any combination of one or more numbers, letters, or any other characters for identifying a version or revision. Thus, for example, a revision number might be "Fred2.12/25/11." Any string of characters that may be used to identify a version or revision of an artifact, source code, or script is considered to be a version number or revision number.

To develop the source code 210, build scripts 215 and test scripts 220, the developers 225 use Integrated Development Environments (IDEs). Possible (IDEs), include, for example, Eclipse™ NetBeans™ and Visual Studio™. These environments may exist on the developer's desktop, or on a server and enable the creation of applications written in Java, C and other languages. IDE integration tools exist to enable developers to check source code 210 and other product components in and out of the source code management repository 222. Additional IDE tools exist to enable building and testing of product components prior to commitment.

The build is an important activity in continuous integration. There are two types of builds. The first type is called a private build. The private build is done by the developer prior to committing changes to the source code management repository 222. The private build allows the developer 225 and the tester 230 to verify new functionality and check for regression at a module level of the source code 210. A private build compiles new source code 210, and unit tests the resulting binary code. Verification of new functionality will typically require that new unit tests be developed as well. If a private build fails, it is the responsibility of the developer to correct the build before committing the source code 210 into the source code management repository 222.

The second type of build is an automated build, which is carried out by the continuous integration server 235 following a commit to a repository. The automated build allows verification of new functionality and checking for regression at the product level. Regression is tested for by running one or more tests written for previous versions of the cloud appliance. The previous versions of the cloud appliance pass those tests and, therefore, if the new version does not pass those tests then the cloud appliance has regressed. The second build is extensive and includes automated code inspection, compilation, unit testing, packaging, deployment, installation, and configuration on one or more test servers, and additional component testing. A number of tools can be used for the continuous integration server 235, for example, CruiseControl™, Jenkins, Hudson, Bamboo™, BuildMaster™, or Teamcity™. If an automated build fails, then the entire development team is responsible for diagnosing and fixing the problem or reverting to a previous version of the cloud appliance contained in the source code management repository 222. The continuous integration server 235 notifies the development team of a build failure, using, for example, email, or instant messaging.

The continuous integration server 235 calls build managers 237 to build the source files in the source code management repository 222. Build managers include for example, Apache Maven™ or MSBuild™. Thus, if a source file is written in, for example, Visual C#™, MSBuild™ may be called by the continuous integration server 235 to build that source file. If a source file is written in Java™, Maven™ may be called to build that source file. The continuous integration server 235 can be configured to start automatically a build of the cloud appliance each time new source code 210 is committed to the source code management repository 222. In some embodiments, the continuous integration server 235 can be configured to automatically start a build of the cloud appliance each time new artifacts 285 are committed to the third-party repository 275 or the open source software repository 280. The continuous integration server 235 may check before performing the build that the project has a dependency on the newly committed source code 210 or artifacts 285 before beginning a new build. In some embodiments, the continuous integration server 235 may begin a new build following a particular schedule, for example, once every day. In some embodiments, the continuous integration server 235 performs a build when manually started by an operator. In some embodiments, the continuous integration server 235 is configured to begin a build following an algorithm, for example, a build begins when three or more different developers have committed code, or a build begins a predetermined time after the last commit, each new commit restarting a timer for the predetermined time.

The continuous integration server 235 implemented with Hudson is particularly well integrated with the build manager Maven™. Hudson is able to parse Maven Project Object Model (POM) files written for Maven™. This allows the Hudson continuous integration server to read the project dependencies. Thus, a Hudson continuous integration server is able to automatically check the dependent files in the source code 210, project scripts 215, test scripts 220, and any third party repository or open source code repository, for new versions of files. If a new version is checked in for any of the above source code 210, project scripts 215, test scripts 220, third party repositories or open source code repositories, the Hudson continuous integration server rebuilds the corresponding project. The third party repositories or open source code repositories may include third party repository 275 or open source code repository 280 maintained by the artifact repository server 260, or any other repositories private or public accessible via a computer network.

The Maven build manager and Maven POM files are very flexible. The POM files can be configured to inherit properties from one another. POM files inherit dependencies, developers and contributors, plug-in lists, report lists, plug-in executions with matching ids, and plug-in configurations. POM files are written in XML.

Maven also allows plug-ins to be written to extend the capabilities of Maven. Plug-ins can be written to provide core functions such as compile source code 210, deploy a particular form of artifact. Plug-ins can also be used to provide functionality to a package, to build output in particular forms such as java archive JAR or enterprise archive EAR, and to build reports.

Plug-ins can also be built that allow Maven to process additional types of file. In the case of building cloud appliances, this is useful because there are many types of file not usually found in source code 210 or repositories. For example, .OVA files and OVF directories would not normally be part of the source code 210, but are a portion of the build for a virtual machine. Similarly, the applications and drivers (.EXE files) and dynamic link libraries (.DLL files) that are to be installed on the virtual machine are not the usual types of files found in source code 210. In addition, these files may require unusual treatment. For example, to build a customized virtual machine, an .OVA file in the third party repository that forms a template for a virtual machine is first untared in to an OVF directory then installed on a hypervisor. When installed, .EXE files may be executed on the virtual machine to install software. Windows PowerShell™ commands may be used to perform some or all of the above. The Windows PowerShell™ commands being in the form of either .PS1 files or as cmdlets that are .NET programs compiled into dynamic link library files. Thus, with plug-ins for .OVA files, OVF directories, .EXE files, .DLL files and .PS1 files, Maven is capable of recognizing the file types and automatically performing the appropriate steps.

In the first step of an automated build and test, the continuous integration server 235 downloads from the source code management server 205, the files describing the project, for example, POM files in the case that the project is documented in Maven format. The continuous integration server 235 also downloads from the source code management server 205 other support files. Next, the continuous integration server starts the appropriate build manager 237 for the project scripts 215. In some embodiments, the source code 210 may be parsed for errors before starting a build manager. As each of the files is parsed, the results of the parsing are documented and stored in the build repository 263. In some embodiments, the parse results are stored with the same version number as the source code 210. This allows the parsing results to be correlated with the source code 210. If, during the testing, source code 210 fails any of the parsing, the developers and the build manager 237 are informed of the failure and the nature of the failure. The developers and the build manager 237 may be informed by e-mail, text message, instant message, or by any other method compatible with embodiments of the disclosure. In some embodiments, the parsing failure information may include the version number for the source code 210. If any of the parsing tests generate a fatal error, then the build is stopped, and the developers are informed.

In some embodiments, the continuous integration server 235 may start more than one build manager. For example, if the project is very large, and can be divided into parts then separate build managers 237 may be started to build the separate parts. If, for example, some of the project scripts require different build managers, for example, some of the source files require MSBuilder, and other files require Maven, more than one build manager 237 may be started and the appropriate source files provided to the corresponding build manager 237. If more that one build manager 237 is started, the artifacts 285 used by one build manager 237 may be subsequently used by another of the build managers 237. For example, if a portion of the source files requires MSBuilder, those files may be built by MSBuilder to form .EXE files. These .EXE files may then be used by a Maven build manager. In some embodiments, a build manager 237 may start a separate build manager 237. For example, a build manager 237 based on Maven might include a plug-in. The plug-in might allow Maven to start a copy of MSBuilder if the source files that Maven is given correspond to source files for MSBuilder. MSBuilder then builds the artifacts 285 while Maven continues to build other files. The build managers 237 compile the source code 210 written in, for example, Java or C# into, for example, .EXE or .DLL files. The build manages 237 also gather other artifacts 285 required for the build from in house and third party repositories. The gathered files include, for example, files for installation packages, configurations, tools, utilities, databases, and documentation, databases, web pages etc. A build failure during any of the builds causes the build and any parallel builds to cease and messages are sent to the developers and the build manager 237 indicating the cause of the failure. As the artifacts 285 are built or gathered, the artifacts 285 are stored in the build repository 263. The artifacts 285 are stored with appropriate unique version numbers so that the build can be identified. In some embodiments, the unique version number is automatically generated and assigned during each build. This version number identifies the components that were used to produce each artifact and enables an artifact to be reproduced in the future if necessary.

When building the cloud appliance, the continuous build manager 237 uses the latest committed source code 210 in the source code management repository 222. When the build is complete, the build is deployed and tested. In continuous integration, builds occur frequently, often each time new source code 210 is committed into a repository. Thus, the new builds may occur before testing on a previous build is complete. In may be several days after the build that testing is complete. Although a first build may work perfectly and pass all the tests, a subsequent build, although incorporating more features, may be regressive and not pass all of the tests. Thus, it may be appropriate to release the first build, but not to release subsequent builds until one of the subsequent builds incorporating the new features passes all the tests. The artifact repository may be filled with a large number of builds with varying numbers of features. Some of the builds may pass all tests and, therefore, be releasable, other builds may not pass all the tests and, therefore, may not be releasable. A release manager 245 is informed which of the builds are suitable for release. The release manager 245 then rebuild from scratch, the releasable code into a release repository 270. An issue that is faced by the release manager 245 is identifying the source 210 and third-party files that were used to construct the releasable build. In waterfall development, this is not an issue because only the latest build from the latest committed source code 210 could be the source code 210 for the release build. However, in continuous development, there are many builds to choose from. Therefore, a link is required between artifacts 285 built and the source code 210 and other artifacts 285 used to build the artifacts 285.

As noted above, the source code management repository 222 keeps track of version numbers for the latest committed source code 210, and all previous versions of the source code 210. Therefore, one method to identify the source code 210, corresponding to a particular build, is to link the version number of the artifacts 285 in the build to the version number of the source code 210 in the source code management repository 222. Thus, for example, the continuous integration server 235 may be configured to read the version number of the most recent source code 210 committed the source code management repository 222 and construct the version number for the artifacts 285 in the build based on the version number of the most recent source code 210. Version numbers for software are often integer numbers separated by periods as delimiters, for example, 1.0, 1.5, 2.0, 2.1, etc. The first integer indicates a major revision in the software that incorporates major new features. The second integer after the period indicates minor revisions to the major revision such as bug fixes, etc. However, as noted above, any string of characters that may be used to identify a version or revision of an artifact, source code, or script is considered to be a version number or revision number. The version numbers, for example, may consist of a single string of characters, or separate strings of characters representing major and minor revisions, wherein the strings are concatenated together. In continuous integration, there may be many versions of the cloud appliance generated between each minor revision suitable for release. Therefore, adding an additional period to a current product version number, followed by an additional string of characters generated based on the version of the source code in the source code management repository 222 is a convenient way to produce a version number for each artifact. Those artifact numbers allow the source code 210 that was used to generate the artifacts 285 in any particular build to be identified. In some embodiments, the additional string of characters is identical to the version number of the most recent source code 210. For example, if the most recent version of the source code 210 is 102, and the current product version number is 1.1, then the version number for the build of the artifacts may be 1.1.102. The next revision of the source code 210 may be 103, in which case the version number for the artifacts would become 1.1.103. In some embodiments, the revision numbers, in the source code management repository 222 may follow a similar pattern to software releases, having a first string of characters indicating a major revision followed by a period and then a second string of characters indicating minor revisions. In such embodiments, the artifact version number may be constructed by adding a period to the product version number and then concatenating the entire revision number for the source code 210. In some embodiments, the period separating the portions of the version numbers may be omitted or replaced by any delimiter character or string of characters compatible with embodiments of the disclosure.

FIG. 3A illustrates examples of revision numbers in a source code management repository, build numbers, and the artifact numbers generated by the above system and methods. Thus, if the product version number is 1.1, and the source code version number is 5.1, then the artifact version numbers in the build would become 1.1.5.1. If a cloud appliance needs to be constructed from scratch the version numbers of the artifacts 285 can be read and the cloud appliance rebuilt from the appropriate source code 210.

In some embodiments, the version number of the source code is manipulated before being incorporated into the version number for the build artifacts 285. For example, the source code version number may be multiplied by a predetermined number. Alternatively, the source code version number may have a predetermined number added. In some embodiments, the source code version number may have one or more characters omitted. In some embodiments, the source code version number may have one or more characters inserted or replaced. In some embodiments, the source code version number may have one or more characters appended to the beginning or the end. In some embodiments, any manipulation of the source code version number, and any method of combining the source code version number with a product version number, compatible with embodiments of the disclosure is within the scope of the disclosure.

The version of the source code number used to form the artifact version numbers may be the only revision number if only one set of source code is extracted from the source code repository to build the artifact. If multiple sets of source code are extracted from the same repository, then each set of source code will have an associated revision number. The build manager may select the highest revision number from among the associated revision numbers. Alternatively, the build manager may combine the associated revision numbers to form a combined version number. The combined version number may identify each set of code with a corresponding version number.

In some embodiments, the build manager updates the version number of the artifact within meta-data associated with the artifact and the updated meta-data is uploaded into the artifact repository with the artifact. In some embodiments, the build manager appends the artifact version number to the name of the artifact or to a folder containing the artifact.

In some embodiments, the build manager updates the artifacts version number within meta-data associated with the artifact and the updated meta-data is uploaded into the artifact repository with the artifact. In some embodiments, the build manager appends the artifact version number to the name of the artifact.

As noted above, there are many ways to construct an artifact number. Depending upon a phase of development of a cloud appliance, or a particular task being performed it is useful to be able to change the way that version numbers for artifacts are generated depending upon the task. One method to change the way that version numbers for artifact are generated is to use tag words associated with build commands to specify how to form the artifact number. The tag words may be, for example, placed in script files or used on a command line or place in meta-data files for artifacts or projects. For example, a command, script or meta-data with x.y.[BUILD] would cause the build engine to create a version number x.y. concatenated with the version of the source code used to build the artifact. Thus, the tag word [BUILD] is replaced by the version number of the source code used to build the artifact. Other tag words may be used to indicate different substitutions thus for example x.y.[DATE] may cause a version number x.y. concatenated with the current date.

In some embodiments, source code from more than one source code management repository 222 may be used to build the cloud appliance. Thus, more than one source code repository version number may be required to identify all of the source code. The version number of the artifacts 285 built may include, therefore, version numbers from more than one repository. The version numbers of source code from the different repositories may be combined, for example, by concatenation, one after another, either before or after the version build number to form the version number for the artifact 285. In a similar manner, version numbers from third-party resources or repositories may be combined, for example, by concatenation to form the version number for artifacts 285 resulting from a build. FIG. 3B illustrates examples of version numbers in an source code management repository, version numbers in a third party repository, build numbers, and the artifact numbers generated by the above concatenation system and methods. In some embodiments, any of the above source code or third party version numbers may be mathematically manipulated or manipulated as strings by, for example, omission, replacement, or addition, of characters before being incorporated into the version number for each artifact of the build. Version numbers for the artifact constructed in the above manner, allow the version of source code and the third-party repository version responsible for the build to be identified.

The artifacts 285 in the third-party repository 275, or artifacts 285 built by the build manager 237 may have meta-data associated with the artifacts 285. For example, some of the software in the third-party repository may require a license to be used, may require certain prerequisites, for example, a particular amount of memory or disk space, or may have particular documentation associated with the artifact such as help files. If the build manager 237 is Maven, and the artifacts 285 are stored in a maven repository, the meta-data can be contained in POM files associated with the artifacts 285. In some embodiments, the continuous integration server 235 is capable of reading the meta-data associated with the artifacts 285. As new artifacts 285 are generated by the build manager 237, the build manager 237 reads the meta-data for source code 210 and artifacts 285 used to generate the new artifacts 285. The build manager 237 combines the meta-data all the artifacts 285 used to generate the new artifacts 285 to form meta-data for the new artifact. Finally, the build manager 237 can combine meta-data for all of the artifacts 285 generated in the build into a single meta-data file for the build. In this manner, a file is generated containing the combination of meta-data for all of the components of the build. Thus, for example, the meta-data file for the build contains all the license information required to use the build. Moreover, the meta-data file for the build may contain all the resource requirements to run the build. Because the meta-data file for the build can be built along with the artifacts themselves, any changes to artifacts 285 required for the build are automatically reflected in the meta-data for the build. Therefore, if the meta-data for each artifact 285 is updated, building the cloud appliance automatically generates, for example, license information, help files, prerequisite information, etc. for the cloud appliance. Changes in the artifacts 285 used in subsequent builds of the cloud appliance are immediately reflected in the license information, help files, and prerequisite information in the subsequent builds. This saves considerable time deploying a new build, and reduces the burden of checking for license compliance and time wasted attempting to deploy a cloud appliance on unsuitable hardware or hypervisor. In some embodiments, the cloud appliance installation software can automatically be configured to request licenses based on the meta-data for the cloud appliance generated using the above process. Further, the costs of a new build can be automatically calculated based on the license fees required to install and use that particular build based on the meta-data for the build.

In some embodiments, the build manager 237 is capable of checking and removing redundant information in the meta-data generated for new artifacts 285 or for a build. For example, two artifacts 285 used for a build may require the same license. The build manager 237 identifies that the same license is listed twice and removes the duplicate information. In another example, one artifact 285 may require significantly greater resources than other artifacts 285, for example, processing speed. In this example, only the highest processing speed may need to be listed in the meta-data for the build. However, required storage space will likely be additive. Thus, the total storage space required for the build will be the addition of the storage space required for each of the artifacts 285 used for the build. In some embodiments, the build manager 237 retains and labels the meta-data for each artifact in the meta-data for the build, but also adds additional information regarding the build. For example, the meta-data for the build lists the storage requirements for each of the artifacts 285 individually, but also calculates and lists the total storage space required. In this manner, the developers can use the meta-data for the build to diagnose which artifact cause which fraction of the resource use, or costs for licensing.

In some embodiments, the build script for the cloud appliance details not only how to compile source code 210 to binary files, such as .EXE or DLL files, but also details how to generate documentation, licensing, resource requirements, website pages, statistics and distribution media (such as Windows MSI files, RPM or DEB files). In some embodiments, any documentation, resource requirements, license requirements, or any other information for the artifacts 285 or source code 210 compatible with embodiments of the disclosure may be placed in meta-data for the source code 210 or artifacts 285. Moreover, any of the above information in meta-data files for the artifacts 285 all source code may be combined to form new meta-data in any manner compatible with embodiments of the disclosure. Examples of other features that can be included and combined in meta-data files include:

1. A cost of a component, the cost can be totaled in a meta-data file for an artifact based on the cost of for each component, as detailed in a corresponding meta-data file for each component. The price of a software solution based on the artifact would then be known from the build.

2. A source of the artifact and how and where it was obtained, based on the information detailed in a corresponding meta-data file for each component of the artifact.

3. A type of the artifact and how it was produced, based on the information detailed in a corresponding meta-data file for each component of the artifact.

4. A documentation requirement for the artifact, based on the information detailed in a corresponding meta-data file for each component of the artifact.

5. Support Instructions for the artifact including how and where to obtain support for the artifact and which portions of the artifact are or are not supported, based on the information detailed in a corresponding meta-data file for each component of the artifact.

6. Installation and configuration instructions for the artifact, based on the information detailed in a corresponding meta-data file for each component of the artifact.

7. End-of-life information for the artifact, based on the information detailed in a corresponding meta-data file for each component of the artifact.

8. Manufacturing instructions including additional assembly and distribution steps for the artifact, based on the information detailed in a corresponding meta-data file for each component of the artifact.

9. Known limitations of the artifact, based on the information detailed in a corresponding meta-data file for each component of the artifact.

Figure 4:
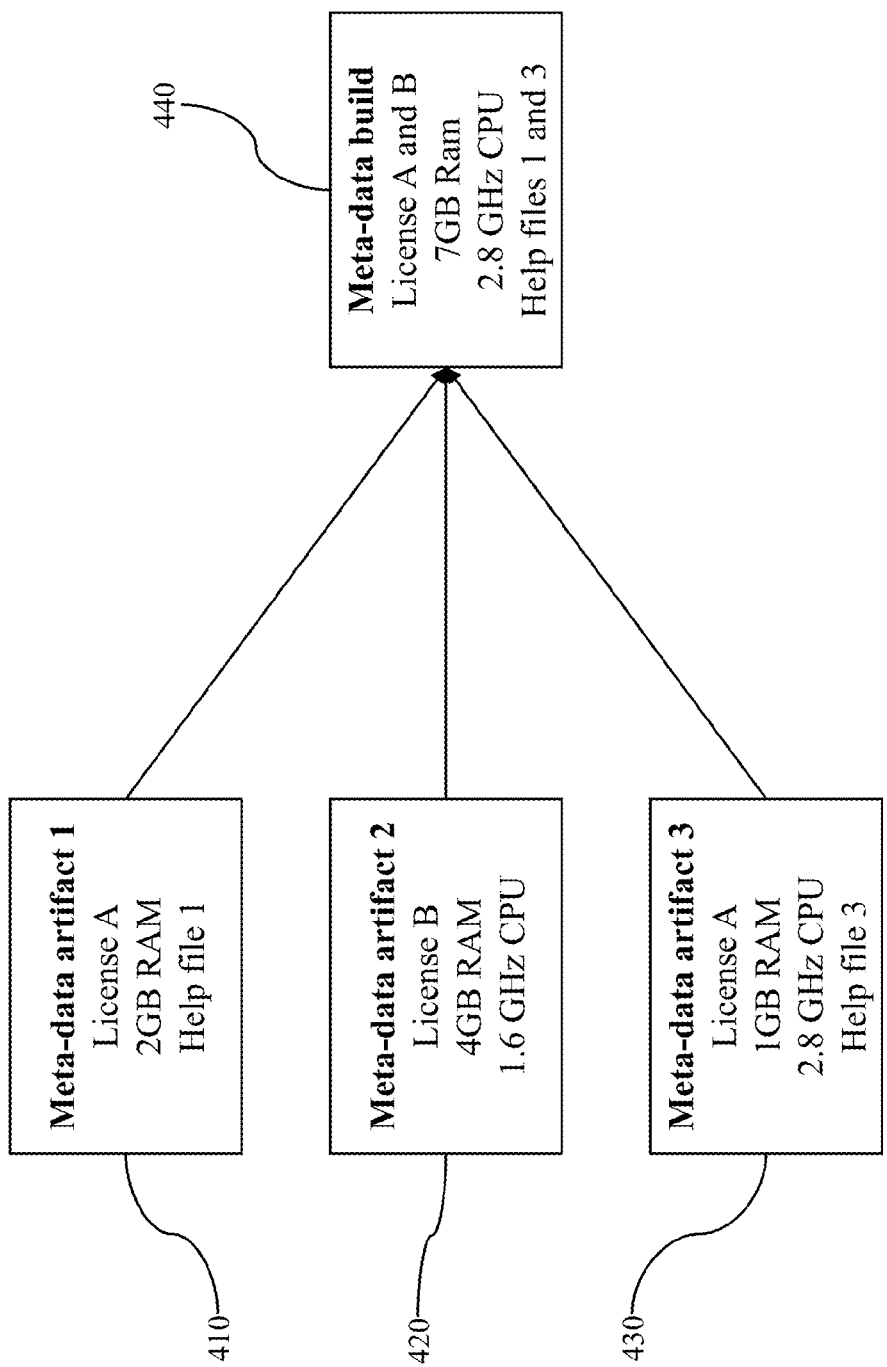
FIG. 4 illustrates meta-data files for artifacts used according to embodiments of the disclosure.
Figure 5B:
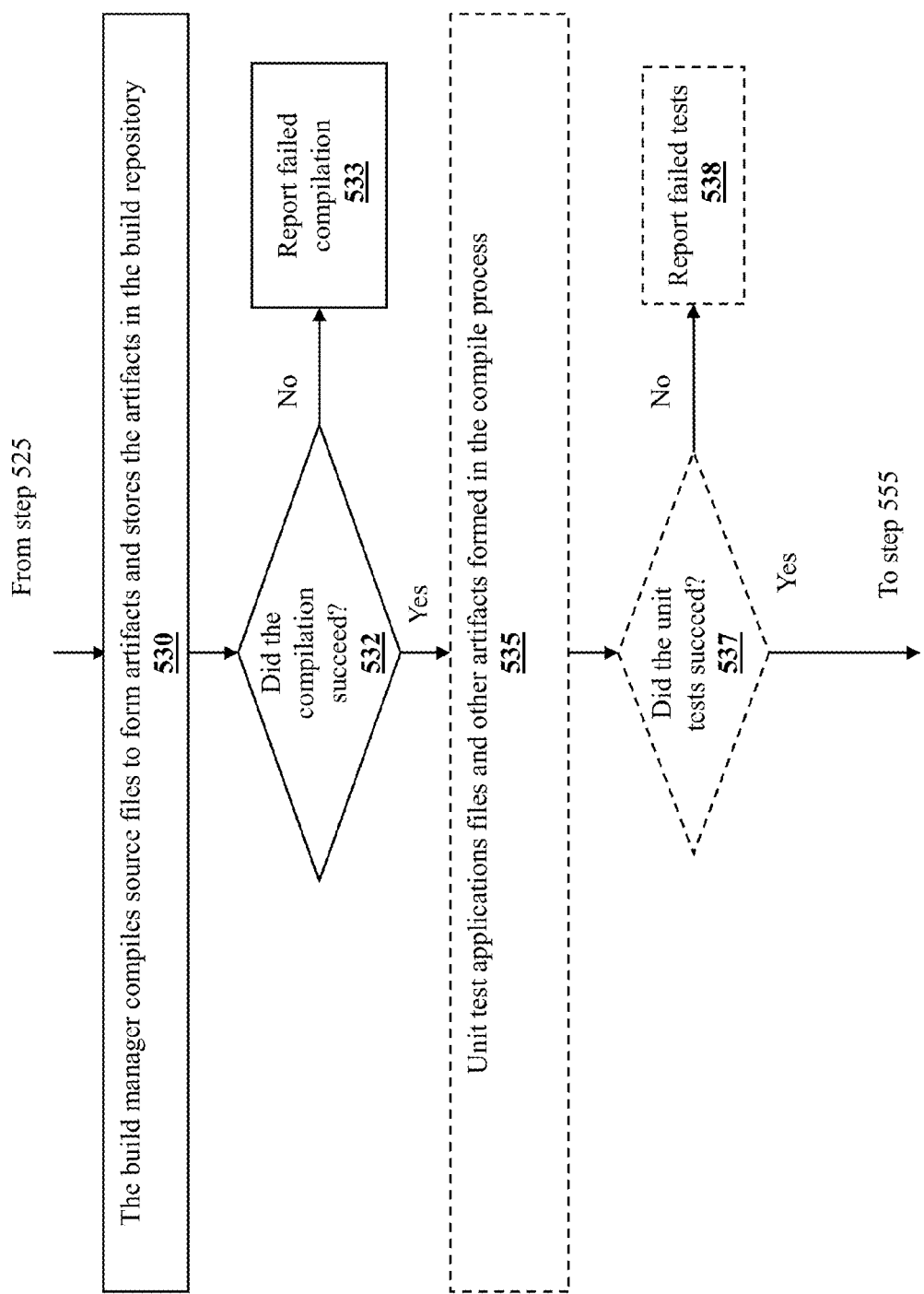
Figure 5C:
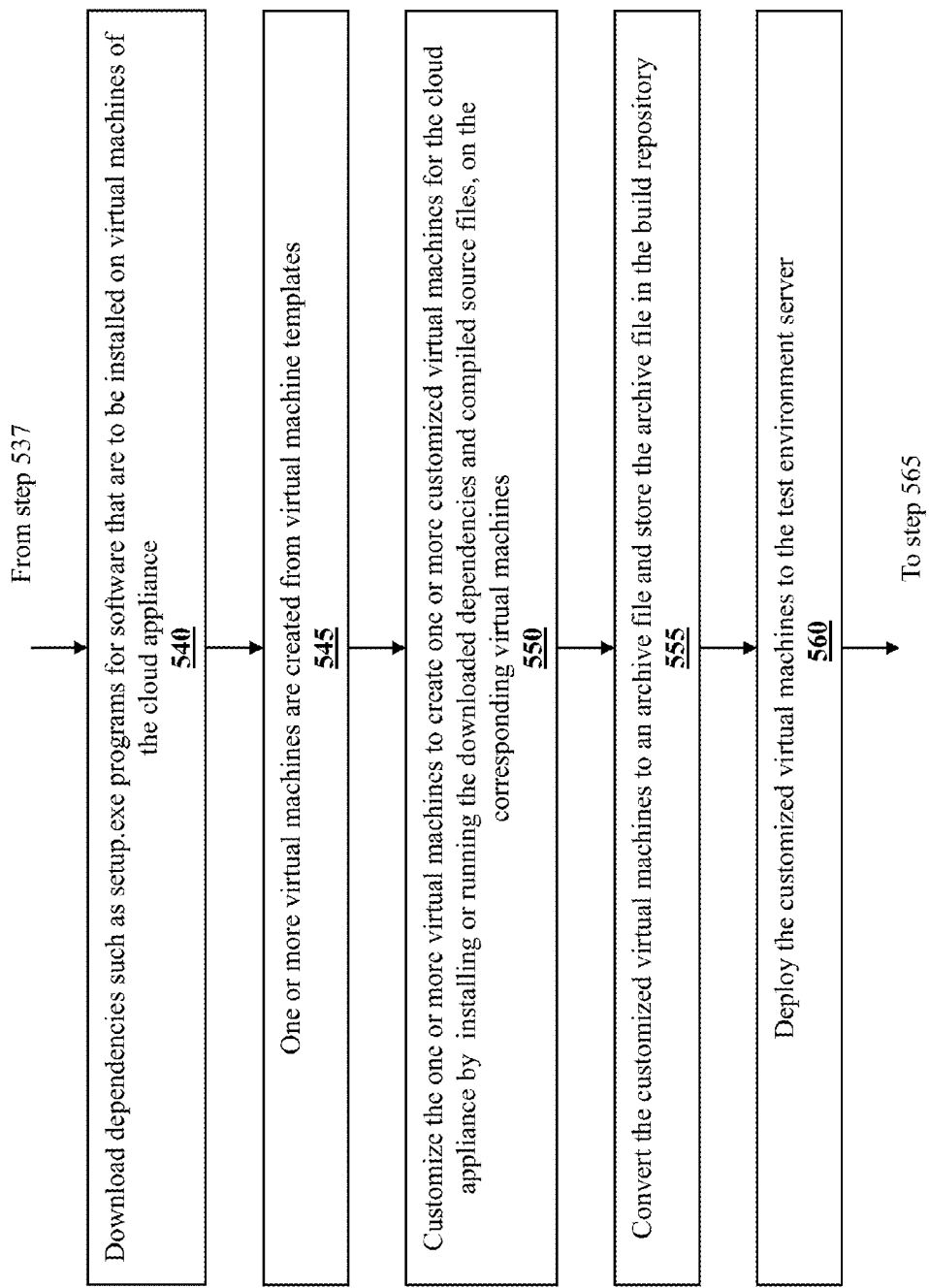
Figure 5D:
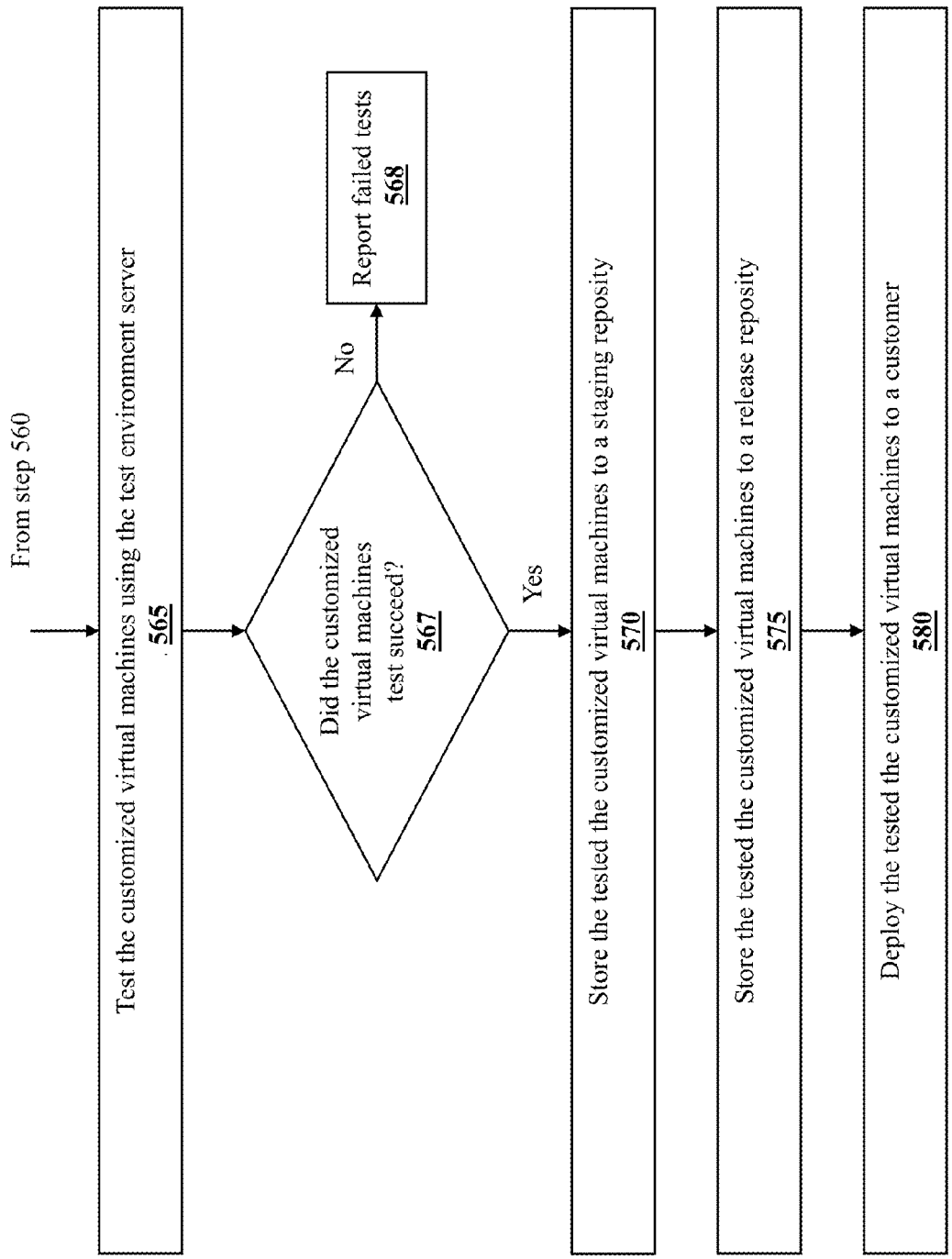

FIG. 4 illustrates meta-data files 410, 420, 430 for artifacts 1, 2, and 3. Each meta-data file specifies a license that is required, resources required, for example, memory, and documentation required, for example, help files. The continuous integration server 235 notes that artifacts 1, 2, and 3 are required for the build of the cloud appliance, therefore, the build manager 237 generates a meta-data file 440 for the build of the cloud appliance. When generating the meta-data file 440, the build manager 237 notes that one copy of License A and one copy of license B is required, that a total of 7 GB of Random access memory (RAM) is required, that a clock speed of at least 2.8 GHz is required, and that copies of Help files 1 and 3 are required. The build manager 237 generates the meta-data file 440, with the above information, as illustrated in FIG. 4.

When all of the artifacts 285 have been saved in the artifact repository 282, along with any meta-data, the continuous integration server 235 may initiate unit tests on artifacts 285 created in the artifact repository 282. For example, executable files (.EXE files) can be installed on either a virtual machine or a real machine in, for example, the test environment server 250. The operation of each of these executable files can then be tested using corresponding test scripts 220, retrieved from the source code management repository, in accordance with test script information stored in the project scripts 215. As each of the tests is performed by the test environment server 250, the results of the tests are documented and stored in the build repository 263. Unit testing frameworks such as, for example, JUnit and NUnit can be used to perform such tests.

In some embodiments, the test results are stored with the same version number of the artifacts 285 produced during the build. This allows the test results to be correlated with particular builds. If, during the testing, the executable file fails any of the tests, the developers 225 and the build manager 237 are informed of the failure and the nature of the failure. The developers 225 and the build manager 237 may be informed by e-mail, text message, instant message, or by any other method compatible with embodiments of the disclosure. In some embodiments, the test failure information may include the version number for the build.

When the unit tests of any artifacts 285 are complete the continuous integration server 235 builds the virtual machines for the cloud appliance specified by the project script 215. To build each virtual machine, the continuous integration server 235 instantiates a virtual machine from a template specified in the project scripts 215 on a hypervisor. When the virtual machine is running, the continuous integration server 235 identifies installation packages, configurations, tools, utilities, databases, documentation, web pages etc. specified by the project scripts 215 and installs the identified installation packages, configurations, tools, utilities, databases, documentation, web pages etc. onto the virtual machine. When all of the installation packages, configurations, tools, utilities, databases, documentation, web pages etc. have been installed, and the virtual machine has been customized, an OVF directory of the customized version machine is generated. In some embodiments, the OVF directory is stored in the build repository 263. In some embodiments, the OVF directory is converted to a .OVA file and stored in the build repository 263.

Customization of the virtual machine generated from the virtual machine template is customized using, for example, Windows PowerShell™ script files, install packages, etc. in much the same way that a stand-alone PC has software installed by a user. The power script files allow configurations that would be input by a user using, for example, dialog boxes on a stand-alone PC to be replaced by instructions in the Windows PowerShell™ script files.

In some embodiments, the customize virtual machine is customized in the test environment server 250. In this case, the test environment server 250 may comprise one or more hypervisors on which to install virtual machines of the cloud appliance. The continuous integration server 235, based on information in the project scripts for the project, identifies the templates for the virtual machines from the build in the build repository 263 and uses the templates to install virtual machines in the test environment server 250. The build manager 237, based on information in the project scripts for the project, identifies installation packages, configurations, tools, utilities, databases, documentation, web pages etc. to be installed on each of the virtual machines, and installs each of these features on the corresponding virtual machine to form a customized virtual machine.

In some embodiments, the customized virtual machine is installed directly from the build repository onto the test environment hypervisor, the customize virtual machine having already been built and customized on a different server.

When the customized virtual machines have been installed, the continuous integration server 235, initiates tests specified in the project scripts 215 to be performed on the customized virtual appliance. As each of the tests is performed by the test environment server 250, the results of the tests are documented and stored in the build repository 263. In some embodiments, the test results are stored with the same version number of the artifacts 285 produced during the build. This allows the test results to be correlated with particular builds. If, during the testing, the customize appliance fails any of the tests, the developers 225 and the build manager 237 are informed of the failure, and the nature of the failure. The developers 225 and the build manager 237 may be informed by e-mail, text message, instant message, or by any other method compatible with embodiments of the disclosure. In some embodiments, the test failure information may include the version number for the build.

In some embodiments, each virtual machine forming the cloud appliance may be unit tested independently, before the cloud appliance is tested as a whole. In some embodiments, only a portion of a cloud appliance comprising a single virtual machine is built at this stage. Each portion of the cloud appliance comprising a single virtual machine is then tested in the test environment server 250. If the tests on the above portion of the cloud appliance are successful, then this portion of the cloud appliance is deployed. Thus, for example, the cloud appliance 100 comprises four virtual machines. Any one of these virtual machines can be compiled and customized individually. So long as the interfaces between the virtual machines do not change, the individual virtual machines can be released independently.

When testing is complete on the cloud appliance, the cloud appliance can be deployed in the test environment server or in any other server so that the developers 225 can observe and continue to test the final cloud appliance. In some embodiments, the continuous integration server 235 automatically deploys any build that passes all tests into an environment for further testing. The continuous integration server 235 may also copy the artifacts 285 for a successful build into a staging repository 265. The artifacts 285 in the staging repository 265 also allow a software development team to share with other teams the components that have been developed. Further, the artifacts 285 in the staging repository 265 may be used by quality assurance and release teams to produce a customer release that is packaged and placed into the release repository. The package data may be in the form of, for example, a .OVA file, a .ZIP file, or any other file, directory structure, or format compatible with embodiments of the disclosure.

In some embodiments, the continuous integration server 235 is adapted to run scripts after a build and test finishes. Thus, the script can be developed to deploy the application to a live test server that all developers and testers can use. Further, the scripts run after the build and test is complete, allow for continuous deployment, in which the software is deployed directly into production and to customer, after the automated tests to prevent defects or regressions.

Automatically deploying the built using continuous deployment has a number of advantages for the customer of the cloud appliance. For example, once the customer has purchased or licensed the cloud appliance, new versions of the cloud appliance that add features or correct errors in the cloud appliance are immediately available for download by the customer. The continuous deployment process run by the continuous integration server 235 may automatically inform customers of new versions of the cloud appliance. A second advantage for the customer is that when the customer purchases or licenses the cloud appliance the customer is able to receive immediately the most up-to-date copy of the cloud appliance stored in the release repository 270. In some embodiments, the cloud appliance may include features that allow the cloud appliance to automatically check for updates in the release repository, and download and install those updates automatically.

FIG. 5A-D illustrate a method for building a cloud appliance, for example, cloud appliance 100, according to an embodiment. The method begins at step 505. At step 505, the source code script, and support file changes are committed into a source code management server, for example, source code management server 205. The changes may be committed by one or more developers working on the software development. When the changes are committed the method proceeds to step 510.

At step 510, changes to artifacts, for example, artifacts 285 in third party or open source repositories are committed. The third party or open source repositories may be on site repositories, repositories available on another computer network, or repositories available on the Internet. When changes to artifacts in third party or open source repositories have been committed the method proceeds to step 515.

At step 515, the continuous integration server is triggered to build the cloud appliance. The build can be triggered manually by an operator. The build can be triggered according to a schedule, for example, once per day. The build can be triggered by a commit or combination of commits by developers. The build may be triggered by any combination of the above methods. When the continuous integration server has been triggered the method proceeds to step 520.

At step 520, the continuous integration server assigns the build job to one or more build managers, for example, build managers 237 and starts the build job or jobs. The build managers may be assigned according to the type of source code to be build, for example, MSBuilder being assigned to build Visual Studio files, and Maven assigned to build Java files. In some embodiments, the build managers may be assigned according to workload. When the assignment of build managers is complete, the method proceeds to step 525.

At step 525, the assigned build manager downloads project scripts and other support files from the source code management repository and executes the build process. When the download is complete the method proceeds to step 530.

At step 530, the assigned build manager compiles source files to form artifacts and stores the artifacts in the build repository. In some embodiments, the build manager may assign version numbers to the artifacts based on version numbers for the source code downloaded. When the compilation is complete the method proceeds to step 532.

At step 532, a determination is made as to whether the compilations were successful. If any compilation failed, the method proceeds to step 533, where the failed compilation or compilations are reported to the developers and the method terminates. If the compilations were successful, the method proceeds to optional step 535.

At step 535, unit test are optionally performed on applications files and other artifacts formed in the compile process. The unit tests are performed by installing and executing the artifacts in a test environment server, or other server. The tests are run according to test scripts, for example, test scripts 220 detailed in the project scripts for the project and downloaded from the source code management repository. When the optional tests are complete, the method proceeds to step 537.

At step 537, a determination is made as to whether the unit tests were successful. If any unit test failed, the method proceeds to optional step 538, where the failed unit test or tests are reported to the developers and the method terminates. If the compilations were successful, the method proceeds to step 540.

At step 540, dependencies are downloaded such as setup.exe programs for software that are to be installed on virtual machines of the cloud appliance. When the dependencies have been downloaded, the method proceeds to step 545.

At step 545, one or more virtual machines are created from virtual machine templates. The virtual machines may be created on a hypervisor of a server or a hypervisor of a test environment server, for example, test environment server 250. When the virtual machines have been created, the method proceeds to step 550.

At step 550, the one or more virtual machines are customized to create one or more customized virtual machines for the cloud appliance by installing or running the downloaded dependencies and compiled source files, on the corresponding virtual machines. When the virtual machines have been customized, the method proceeds to step 555.

At step 555, the customized virtual machines are converted to an archive file and the archive file is stored in the build repository, for example, build repository 263. The archive file may, for example, a .OVA file. When the archive file has been stored in the repository, the method proceeds to step 560.

At step 560, the customized virtual machines are deployed to the test environment server, for example, test environment server 250. When the customized virtual machines have been deployed in the test environment server, the method proceeds to step 565.

At step 565, the customized virtual machines are tested using the test environment server. The continuous integration server, request tests specified in the build script for the cloud appliance to be performed by the test environment server. When the tests are complete the method proceeds to step 567.

At step 567, a determination is made as to whether the unit tests were successful. If any unit test failed, the method proceeds to step 568, where the failed unit test or tests are reported to the developer and the method terminates. If the compilations were successful, the method proceeds to step 570.

At step 570, the tested customized virtual machines are store as the archive file in a staging repository, for example, staging repository 265. The staging repository allows other teams developing software and systems to deploy and use the cloud appliance, to test whether the cloud appliance is compatible with systems the other teams have developed. Further, the staging repository allows deployment teams to gain access to the cloud appliance, so that they can evaluate the cloud appliance for release to clients and complete any packaging before release. When the development teams are satisfied that the card appliance is ready for release to clients, the method proceeds to step 575.

At step 575, the tested customized virtual machines are stored to a release repository, for example, release repository 270. At step 580, the tested customized virtual machines are deployed to a customer.

Figure 6:
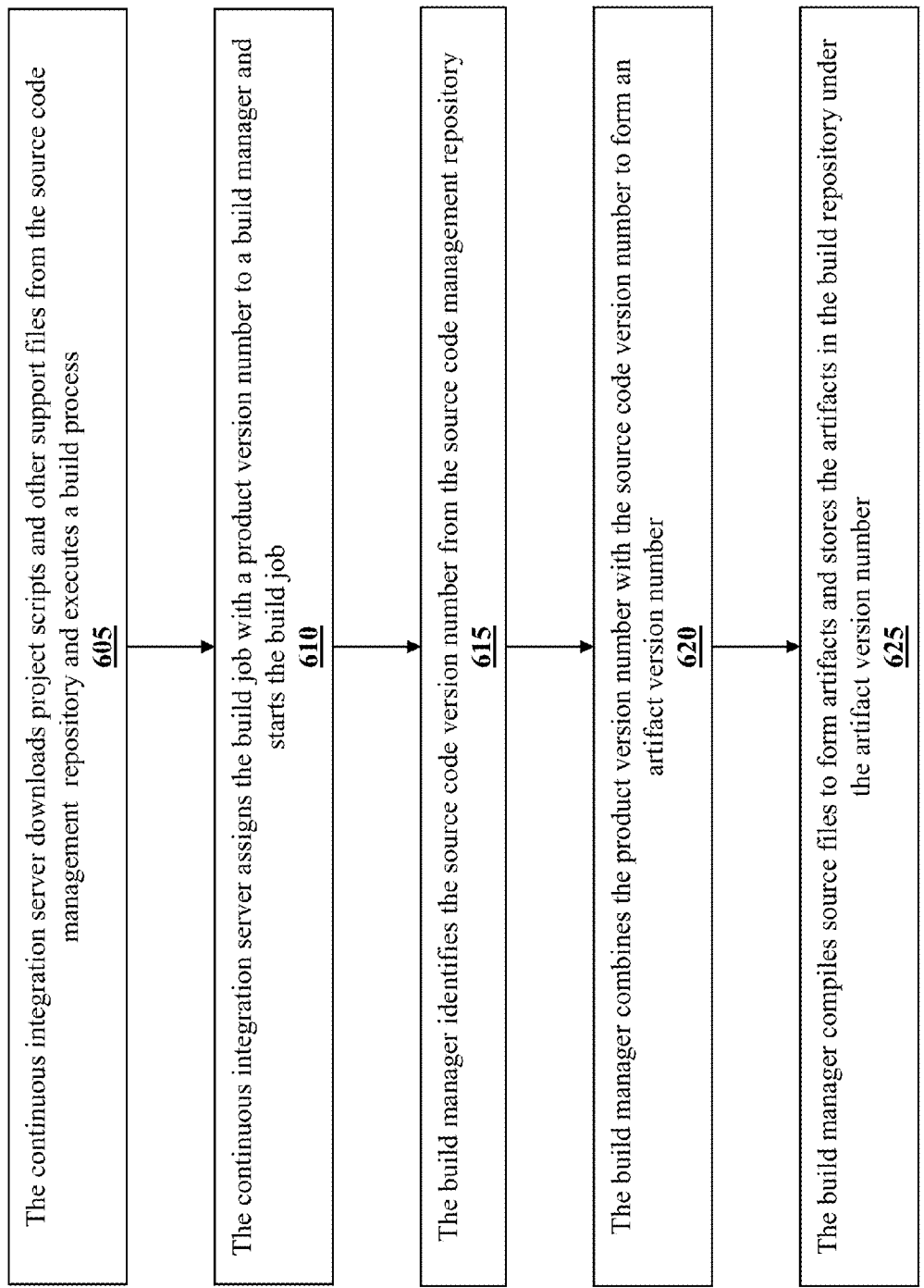
FIG. 6 illustrates a method of generating version numbers for artifacts in a build process according to an embodiment.

FIG. 6 illustrates a method for generating version numbers for artifacts in a build process according to an embodiment. The method begins at step 605. At step 605, a continuous integration server, for example, continuous integration server 235, downloads project scripts and other support files from the source code management repository, for example, source code management repository 222 and executes the build process. When the downloads are complete the method proceeds to step 610.

At step 610, the continuous integration server assigns a build job with a product version number to a build manager, for example, build manager 237 and starts the build job. When the build job has been started, the method proceeds to step 615.

At step 615, the build manager identifies the source code version number for the build from the source code management repository. As discussed above, the code version number for the source code is maintained by the source code management repository server based on commits by developers. Each commit causes the source code management repository server to generate a new version number, and to store the source code under that version number. In some embodiments, the build manager may also identify version numbers for items in the build from third-party repositories and open source software repositories. When the version numbers have been identified, the method proceeds to step 620.

At step 620, the build manager combines the product version number with the source code version number to form an artifact version number. The product version number and the source code version number may be combined in any manner discussed above to form the artifact version number. In some embodiments, the artifact version number is a combination of the product version number, and the source code version number. In some embodiments, the artifact version number is a combination of the product version and the version numbers for any third-party repositories or open-source software repositories used in the build. When the artifact version number has been formed, the method proceeds to step 625.

At step 625, the build manager compiles source files to form artifacts and stores the artifacts in the build repository under the artifact version number.

Figure 7:
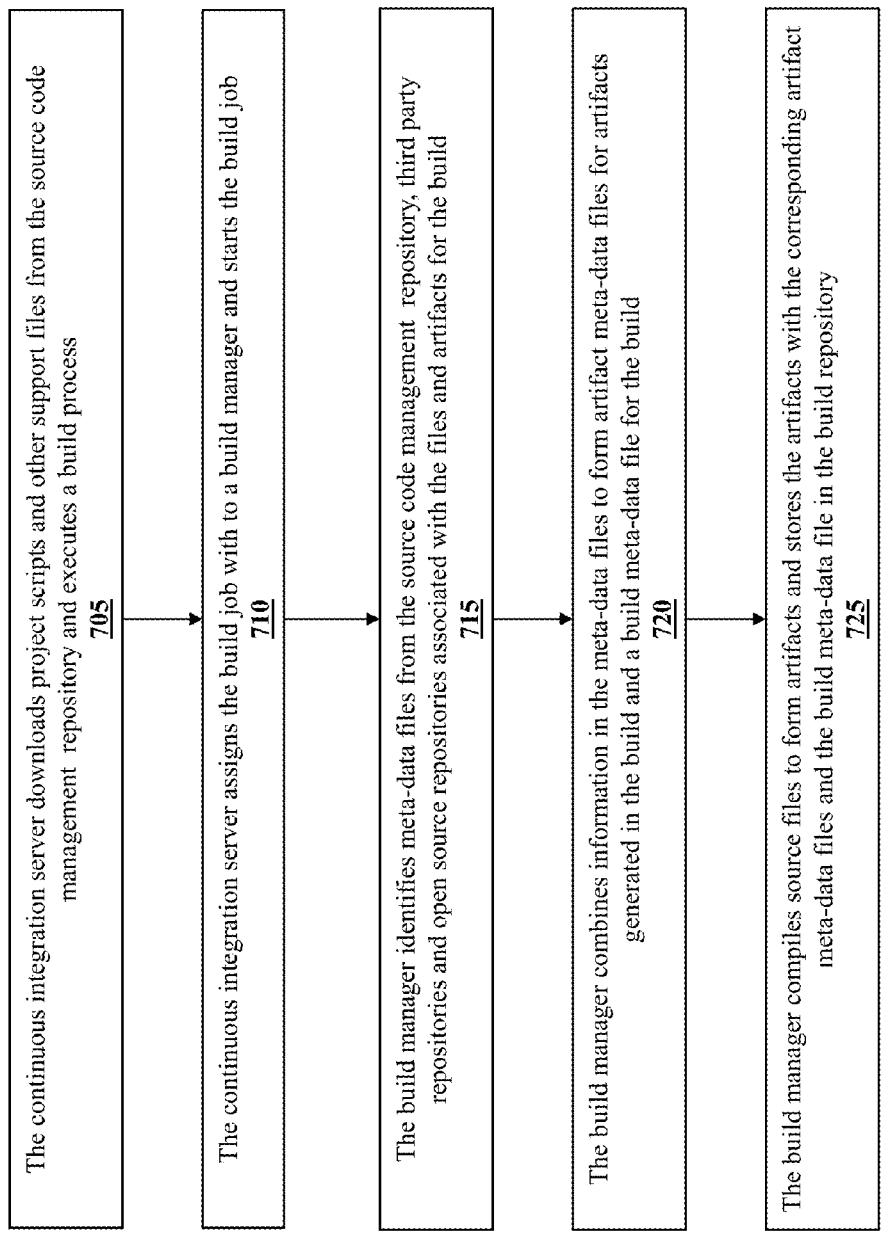
FIG. 7 illustrates a method of generating meta-data for artifacts in a build process according to an embodiment.

FIG. 7 illustrates a method for generating meta-data for artifacts in a build process according to an embodiment. The method begins at step 705. At step 705, a continuous integration server, for example, continuous integration server 235, downloads project scripts and other support files from the source code management and artifact repositories and executes the build process. When the downloads are complete the method proceeds to step 710.

At step 710, the continuous integration server assigns the build job to a build manager and starts the build job or jobs.

At step 715, the build manager, for example, build manager 237 identifies meta-data files from the artifact repository, third party repositories and open source repositories associated with the files and artifacts for the build. When the meta-data files have been identified the method proceeds to step 720.

At step 720, the build manager combines information in the meta-data files to form artifact meta-data files for artifacts generated in the build and a build meta-data file for the build. As discussed above, any documentation, resource requirements, license requirements, or any other information for the artifacts or source code compatible with embodiments of the disclosure may be placed in meta-data for the source code or artifacts. This meta-data information may be combined in any useful manner to indicate the documentation, resource requirements, license requirements, etc. for the artifacts formed in the build and the build as a whole. When the information has been combined to form meta-data files for the artifacts generated and the build, the method proceeds to step 725.

At step 725, the build manager compiles source files to form artifacts and stores the artifacts with the corresponding artifact meta-data files and the build meta-data file in the build repository.

The methods described above are merely exemplary. The order of the method steps may be changed, steps may be omitted, or additional steps may be inserted before, between, or after the method steps described above.

Figure 8:
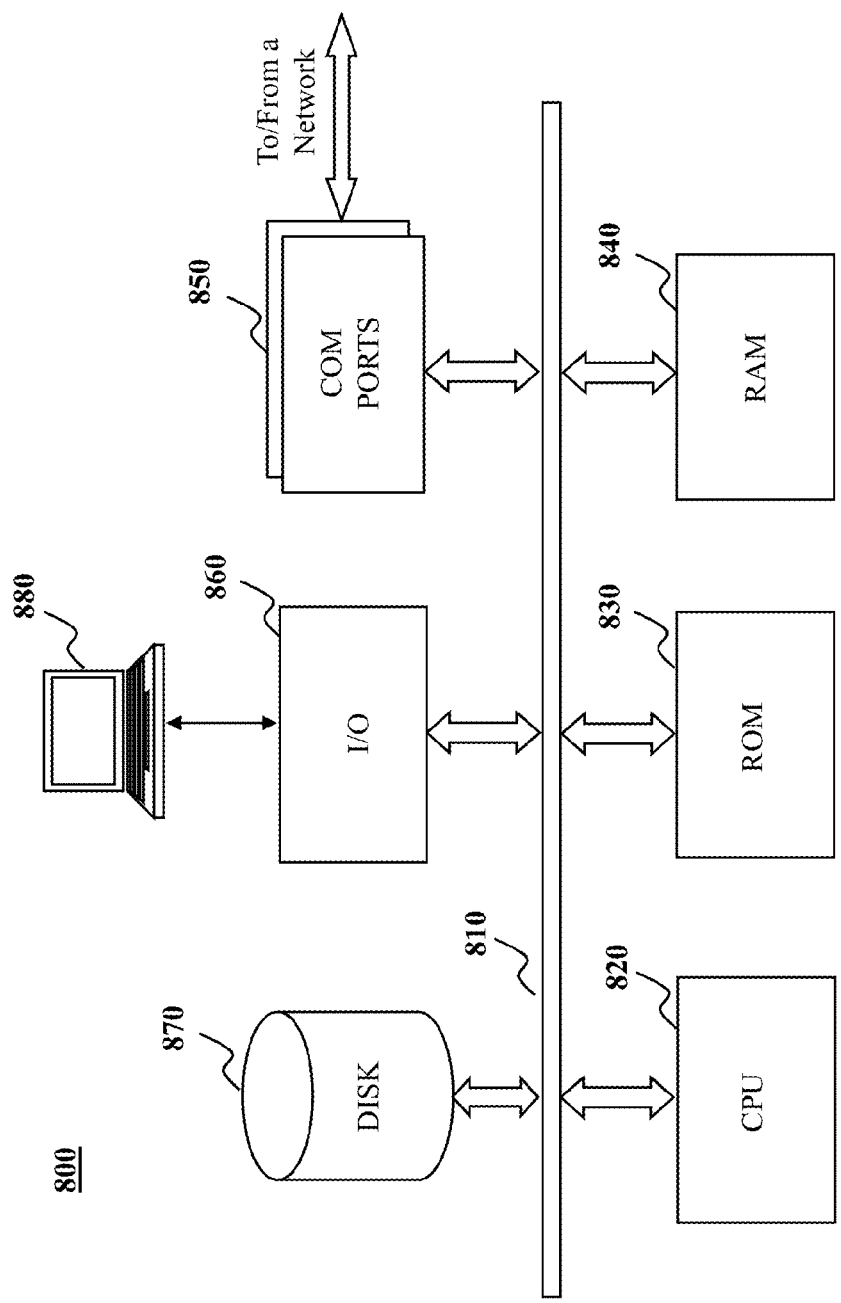
FIG. 8 illustrates a general computer architecture on which the present embodiments can be implemented.

FIG. 8 illustrates a general computer architecture on which the present embodiments can be implemented and has a functional block diagram illustration of a computer hardware platform that includes user interface elements. The computer may be a general-purpose computer or a special purpose computer. The computer 800 can be used to implement any components of the system 200 for continuous integration. For example, the source code management server 205, the continuous integration server 235, the build manager 237, the test environment server 250, and the artifact repository server can all be implemented on a computer such as computer 800, by using the hardware, software program, firmware, or a combination of these components of the computer 800. Although only one computer 800 is shown, for convenience, the computer functions relating to single sign on may be implemented in a distributed fashion on a number of similar platforms, to distribute the processing load.

The computer 800, for example, includes COM ports 850 connected to and from a network to facilitate data communications. The computer 800 also includes a central processing unit (CPU) 820, in the form of one or more processors, for executing program instructions. The exemplary computer platform includes an internal communication bus 810, program storage and data storage of different forms, for example, disk 870, read only memory (ROM) 830, or random access memory (RAM) 840, for various data files to be processed and/or communicated by the computer, as well as possibly program instructions to be executed by the CPU. The computer 800 also includes an I/O component 860, supporting input/output flows between the computer and other components such as user interface elements 880. The computer 800 may also receive programming and data via network communications.

Hence, aspects of the methods and systems for continuous integration according to an embodiment, as discussed above, may be embodied in program elements. Program aspects of the embodiments may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the program elements.

All or portions of the program elements may at times be communicated through a network such as the Internet or various other telecommunication networks. Such communications, for example, may enable loading of the software from one computer or processor into another, for example, from a management server or host computer into the hardware platform(s) of a computing environment or other system. Other types of media that may carry the program elements include optical, electrical and electromagnetic waves, such as used across physical interfaces between local devices, through wired, and optical networks and over various wireless links. The physical elements that carry such waves, such as wired or wireless links, optical links, or the like, also may be considered as media carrying the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, which may be used to implement the single sign on system or any of the components of the single sign on systems as shown in the drawings. Volatile storage media include dynamic memory, such as a main memory of such a computer platform. Tangible transmission media include coaxial cables, copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media, therefore, include, for example, a floppy disk, a flexible disk, hard disk, solid state disk magnetic tape, any other magnetic medium, a CD-ROM, DVD, Blue-Ray™ or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The embodiments described above are intended to be exemplary. One skilled in the art recognizes that numerous alternative components and embodiments that may be substituted for the particular examples described herein and still fall within the scope of the invention.

What is claimed is:

1. A system having a processor for generating meta-data for a product comprising:
    an artifact repository that stores first artifacts for building the product, wherein the product comprises a virtual machine operable on a cloud appliance, the artifact repository storing first meta-data for one or more of the first artifacts; and
    a build manager that builds second artifacts for the product from source code and one or more of the first artifacts based on information in a project script, the build manager adapted to combine the first meta-data for each of the one or more of the first artifacts used to build the second artifact to form second meta-data for each of the second artifacts, the second meta-data formed by combining source code meta-data for the source code used to build the second artifact with the first meta-data descriptive of the first artifacts used to build the second artifact.

2. The system according to claim 1, wherein the first meta-data comprises license information, and the second meta-data is formed by the build manager concatenating the license information from each first artifact specified in the project script, and deleting duplicate license information from the second meta-data.

3. The system according to claim 2, wherein the build manager is adapted to calculate a license fee for the product based on the second meta-data.

4. The system according to claim 1, wherein the first meta-data comprises resource information, and the second meta-data is formed by the build manager selecting a largest value for the resource information from among the first artifacts specified in the project meta-data.

5. The system according to claim 1, wherein the first meta-data comprises artifact-specific information, and the second meta-data is formed by the build manager combining values for the artifact-specific information from each of first artifacts specified in the project meta-data and performing operations on the artifact-specific information from each of the first artifacts.

6. The system according to claim 5, wherein the performed operations comprise excluding duplicate information from the first meta-data.

7. A method for generating meta-data for a product comprising:
- an artifact repository storing first artifacts for building the product and first meta-data for one or more of the stored first artifacts, wherein the product comprises a virtual machine operable on a cloud appliance;
- a build manager building second artifacts for the product from source code and one or more of the first artifacts based on information in a project meta-data; and
- the build manager combining the first meta-data for each of the one more of the first artifacts used to build the second artifact and source code meta-data for source code to form second meta-data for each of the second artifacts.

8. The method according to claim 7, wherein the first meta-data comprises license information, and the build manager forming the second meta-data by concatenating the license information from each first artifact specified in the project script, and deleting duplicate license information from the second meta-data.

9. The method according to claim 8, wherein the build manager is adapted to calculate a license fee for the product based on the second meta-data.

10. The method according to claim 7, wherein the first meta-data comprises artifact-specific information, the build manager forming the second meta-data by performing operations, on the artifact-specific information from the first artifacts specified in the project meta-data.

11. The method according to claim 10, wherein the performing operations include at least one of selecting a maximum value selecting a minimum value, adding averaging, or concatenating the artifact-specific information from among the first artifacts specified in the project meta-data.

12. The method according to claim 7, wherein the first meta-data comprises documentation information, and the build manager forming the second meta-data by concatenating the documentation information from each first artifact specified in the project script, and deleting duplicate documentation information from the second meta-data.

13. A machine-readable tangible and non-transitory medium with information recorded thereon, wherein the information, when read by a machine, causes the machine to perform the following steps:
- storing, by an artifact repository, first artifacts for building a product and storing, by the artifact repository, first meta-data for one or more of the stored first artifacts, wherein the product comprises a virtual machine operable on a cloud appliance;
- building, by a build manager, second artifacts for the product from source code and one or more of the first artifacts based on information in project meta-data;
- combining, by the build manager, the first meta-data for each of the one or more of the first artifacts used to build the second artifact and source code meta-data for the source code to form second meta-data for each of the second artifacts.

14. The machine-readable medium according to claim 13, wherein the first meta-data comprises license information, and the build manager forming the second meta-data by concatenating the license information from each first artifact specified in the project script, and deleting duplicate license information from the second meta-data.

15. The machine-readable medium according to claim 14, wherein the build manager is adapted to calculate a license fee for the product based on the second meta-data.

16. The machine-readable medium according to claim 13, wherein the first meta-data comprises resource information, the build manager forming the second meta-data by selecting a largest value for the resource information from among the first artifacts specified in the project script.

17. The machine-readable medium according to claim 13, wherein the first meta-data comprises resource information, and the build manager forming the second meta-data by adding values for the resource information from each of first artifacts specified in the project script.

* * * * *